United States Patent
Abu Qahouq (10) Patent No.: US 8,674,674 B1
(45) Date of Patent: Mar. 18, 2014

(54) POWER CONVERTER WITH ADAPTIVE VOLTAGE POSITIONING CONTROLLER

(75) Inventor: Jaber A. Abu Qahouq, Tuscaloosa, AL (US)

(73) Assignee: The Board of Trustees of the University of Alabama for and on behalf of the University of Alabama, Huntsville, AL (US)

(*) Notice: Subject to any disclaimer, the term of this patent is extended or adjusted under 35 U.S.C. 154(b) by 0 days.

(21) Appl. No.: 13/368,142

(22) Filed: Feb. 7, 2012

Related U.S. Application Data (63) Continuation-in-part of application No. 13/195,673, filed on Aug. 1, 2011.

(60) Provisional application No. 61/369,436, filed on Jul. 30, 2010.

(51) Int. Cl.
*G05F 1/00* (2006.01)

(52) U.S. Cl.
USPC .......................... 323/283; 323/285

(58) Field of Classification Search
USPC .................. 323/282, 283, 284, 271, 351
See application file for complete search history.

(56) References Cited

U.S. PATENT DOCUMENTS

| | | | | |
|---|---|---|---|---|
| 7,148,669 B2* | 12/2006 | Maksimovic et al. | ........ | 323/283 |
| 7,317,306 B2* | 1/2008 | Fite | ................ | 323/284 |
| 7,463,011 B2* | 12/2008 | Sharma | ................ | 323/283 |
| 7,521,913 B2* | 4/2009 | Tang et al. | ................ | 323/283 |
| 7,902,803 B2* | 3/2011 | Peng et al. | ................ | 323/283 |
| 2006/0226822 A1* | 10/2006 | Xu et al. | ................ | 323/283 |
| 2007/0222463 A1* | 9/2007 | Qahouq et al. | ................ | 324/712 |
| 2007/0236200 A1* | 10/2007 | Canfield et al. | ................ | 323/284 |
| 2008/0310201 A1* | 12/2008 | Maksimovic | ................ | 363/85 |

* cited by examiner

*Primary Examiner* — Gary L Laxton
*Assistant Examiner* — Alex Torres-Rivera
(74) *Attorney, Agent, or Firm* — Maynard, Cooper & Gale P.C.; Jon E. Holland (57) ABSTRACT

A power converter has a controller that uses as input a voltage output of the converter and provides a signal for controlling the duty cycle without the need for current sensing. In one embodiment, the output characteristic of the converter is similar to the output characteristic provided by conventional adaptive voltage positioning (AVP) controllers, but by eliminating the need to sense current, the converter's cost, complexity, and power consumption can be reduced.

21 Claims, 6 Drawing Sheets

Digital Controller with Conventional AVP
(Example of a Conventional Method)

POWER CONVERTER WITH ADAPTIVE VOLTAGE POSITIONING CONTROLLER

CROSS REFERENCE TO RELATED APPLICATION

This application is a continuation-in-part of U.S. patent application Ser. No. 13/195,673, entitled "Power Converter with Adaptive Voltage Positioning Controller" and filed on Aug. 1, 2011, which is incorporated herein by reference. U.S. patent application Ser. No. 13/195,673 claims priority to U.S. Provisional Application No. 61/369,436, entitled "Power Converter with Adaptive Voltage Positioning Controller," and filed on Jul. 30, 2010, which is incorporated herein by reference.

RELATED ART

A power converter receives an input voltage and furnishes an output voltage to a load, such as an electrical device, electronic circuits or a computer. The output voltage and corresponding current from the converter should satisfy certain specifications for properly powering the load. As an example, the power converter may receive a 12 volt input, and the load, such as an integrated circuit chip in a computer, may require a 1.5 volt output from the converter for the load to operate as expected. Further, the output voltage should remain within a desired voltage range, a target value, as is often described in a powered device specification.

In such an example, the power converter converts the 12 volt input to the 1.5 volt output, and supplies the 1.5 volt output to the load. In converting the input voltage to the output voltage, the power converter regulates, i.e., controls, the output voltage under variable load currents, such that 1.5 volts is supplied to the load.

Typically, the power converter controlling device comprises switching logic and drivers that turn on and off with a given time ratio to the switching cycle, in order to regulate the output voltage and output current. The duty cycle is the ratio of the on-time to the total time of an on-off cycle and ideally can have values between 0 and 1. The switching logic and drivers are designed to ensure that the output voltage and current remain within a specified range. The switching logic, in general, may be referred to as the controller of the power converter. The purpose of the switching logic is to ensure that the output voltage only varies slightly above (overshoot) or slightly below (undershoot) a target output voltage. In addition, the power converter sometimes performs other functions such as current/voltage protection, current sharing, and adaptive voltage positioning.

The controller design and related transfer function for closed loop compensation may become very complicated, consuming time and resources. The controller may be implemented via large circuitry that consumes significant amount of power to perform complex calculations. The compensator of a controller is often designed based upon approximating the power stage transfer function of the power converter. Analog controllers have provided good performance in many power converter applications. However, as the increased need for lower output voltages has evolved and the desire for additional advanced functions from the controller, it appears that digital controllers are becoming strong competitors to replace analog controllers. Because the signals, such as output voltage, input voltage, and output current, of the power converter are analog values, digital controllers require analog-to-digital converters (ADCs). Typically one ADC is used to convert the output voltage to a digital voltage, and another ADC is used to convert the output current from a current sensor to a digital current. A digital controller then responds to the digital voltage and the digital current in such a way as to adjust the duty cycle for maintaining a desired output voltage and output current. One of the conventional digital control methods is based on an adaptive voltage position (AVP) method that provides good regulation performance desired by the load.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure relates to controllers and methods for controlling power converters. In embodiments described within the disclosure, a direct current-to-direct current (DC-DC) buck converter serves as an exemplary converter. Other converters could use improved controllers in accordance with the disclosure using derived sensorless AVP (SLAVP) laws based on a specific power converter circuit topology. A controller comprises logic that monitors and processes converter parameters, such as voltage and current, and provides an error signal for adjusting the duty cycle of a PWM modulator. The controller generally has both analog components and digital components although a controller may comprise only analog components or digital components if desired. An analog signal, such as the output voltage or the output current, is often converted to a digital signal for processing by digital components, such as a digital closed loop compensator.

This disclosure describes embodiments of controllers for controlling power converters. A new converter in accordance with at least one exemplary embodiment has performance that is at least equivalent to a conventional adaptive voltage positioning (AVP) controller. In general, both the new controller and the conventional controller provide the converter with an output voltage that is relatively noise free, a desired outcome. However, the new controller has reduced complexity and cost. The new controller, referred to as a sensorless AVP (SLAVP) controller, does not rely on the value of the load current provided by a current sensor. The SLAVP controller combines, as will be described, an error signal and a predetermined voltage to generate a reference voltage. The reference voltage from the SLAVP controller and the output voltage of the converter are processed by a compensator to generate the error signal. The feedback loop provided by the SLAVP controller causes the output voltage of the converter to essentially duplicate a voltage-time curve of an AVP controller. Because the SLAVP controller of the instant embodiment and AVP provide similar functionality, the two controllers provide similar performance. However, the SLAVP controller does not require current sensing. Hence, the SLAVP controller reduces the dynamic output voltage deviation, a desired outcome, so there are very few voltage oscillations in the output of the converter. The reference voltage is generated by of the SLAVP controller is an input to the compensator. While the description below focuses on implementing the SLAVP controller as a digital controller, another controller may be implemented as an analog controller or a controller with a combination of analog and digital components.

Figure 1:
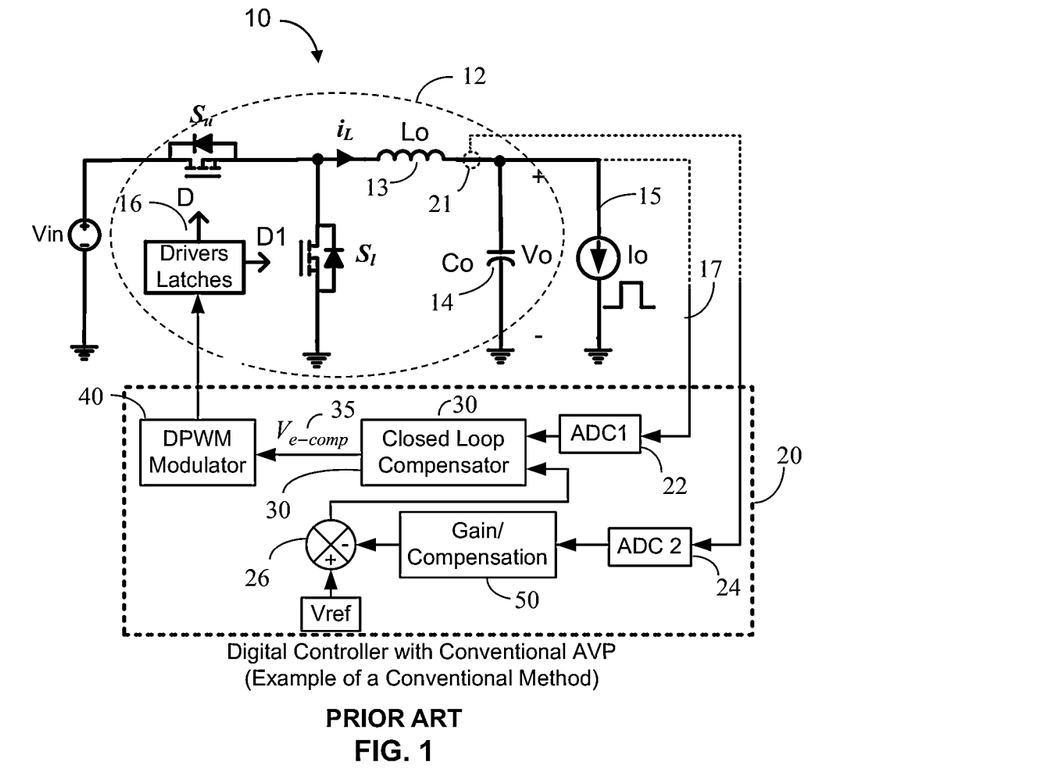
FIG. 1 is a block diagram depicting a power converter with a conventional adaptive voltage positioning (AVP) controller.

FIG. 1 depicts an AVP power converter 10 having power conversion elements 12 and an AVP digital controller 20. The power conversion elements 12 include an inductor 13, a capacitor 14, and drivers and latches 16. The drivers and latches 16 are controlled by a digital pulse width modulation (DPWM) modulator 40. The duty cycle, D, of the DPWM 40 is adjusted by $V_{e\text{-}comp}$, an error voltage 35. The digital controller 20 has two inputs. One of the inputs is the load current, detected by a current sensor 21. The load current is changed to a digital value by an analog-to-digital converter (ADC) 24. The other input is the output voltage 17 of the converter 10. A gain/compensator 50 processes the load current and combines the results with a reference voltage using summer 26. The output of the summer 26 and the voltage output 17 are inputs to a compensator 30. The output of the compensator 30 is the error voltage 35, which is applied to the DPWM modulator 40. In response, the modulator 40 adjusts the duty cycle, D, so that the energy flowing to the capacitor 14 and inductor 13 can provide a desired output voltage.

Figure 2:
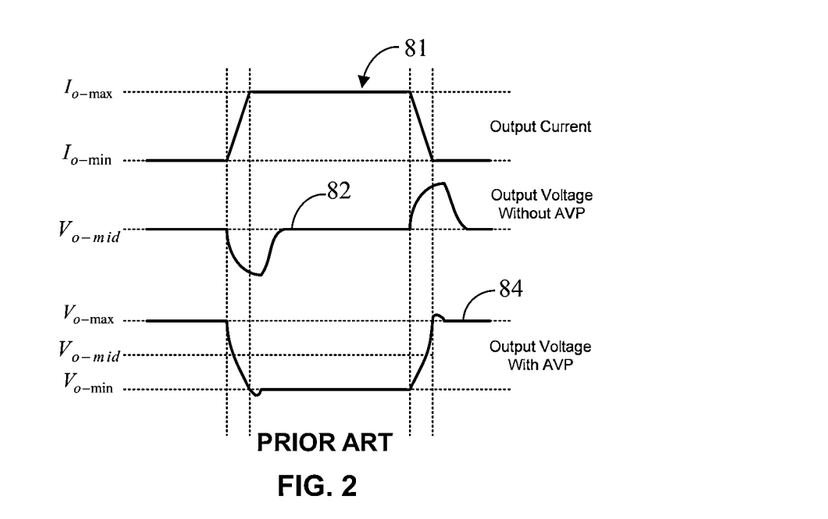
FIG. 2 is a graph depicting behavior of the conventional power converter system of FIG. 1 in response to load changes.

Several waveforms are depicted in FIG. 2 that indicate the performance of converters. If a powered circuit requires very little current, then the output current of the converter is represented by $I_{o\text{-}min}$ in time-current curve 81. When a load requiring maximum current is coupled to the converter, then a current value of $I_{o\text{-}max}$ flows from the converter 10 as depicted by current-time curve 81. The response of a converter without AVP (no current sensor 21 is used), is depicted by voltage-time curve 82 of FIG. 2. The time-voltage curve 82 shows a voltage undershoot as the current increases and a voltage overshoot as the current decreases. The amount of overshoot and undershoot of the output voltage shown in curve 82 is undesirable since it introduces noise into the powered circuit. Such noise often causes the powered circuit to have degraded performance. The output of the converter 10 with AVP control is depicted by voltage-time curve 84. The output voltage of the converter having the AVP controller 20 initially has a value of $V_{o\text{-}max}$ and then drops to $V_{o\text{-}min}$ as the load current increases. The transition from $V_{o\text{-}max}$ to $V_{o\text{-}min}$ is relatively smooth and there is very little undershoot. When the current decreases the output voltage makes a transition between $V_{o\text{-}min}$ and $V_{o\text{-}max}$ with very little overshoot. The waveform depicted by voltage-time curve 84 produces some noise, but much less than if there were no AVP controller 20 controlling the converter. The converter with the AVP controller 20 provides an output voltage with a reduced dynamic deviation when compared to the converter without AVP control. The AVP controller 20 controls the converter in such a way that a desirable output voltage is available for powering integrated circuits and other such loads.

Figure 3:
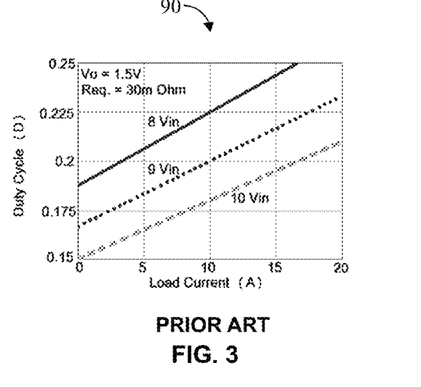
FIG. 3 is a graph depicting behavior of the power converter of FIG. 1 with various voltage inputs.
Figure 4:
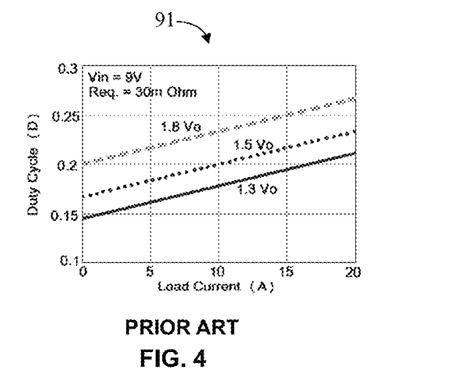
FIG. 4 is a graph depicting behavior of the power converter of FIG. 1 with various voltage outputs.

The relationship between output current, output voltage and duty cycle of a converter (the buck type converter used as an example for the present disclosure) is depicted in FIG. 3 and FIG. 4. FIG. 3 graphically depicts a converter having an output voltage of 1.5 volts. Several values of input voltages (8 volts, 9 volts, and 10 volts) as shown by the three lines of the graph 90 are applied to the converter. As the need for load current increases (shown along the horizontal axis) and going from 0 to 20 amps, the duty cycle, D, increases (shown along the vertical axis) in the range between around 0.15 and 0.25. FIG. 4 graphically depicts, graph 91, the relationship between several output voltages (1.3 volts, 1.5 volts, and 1.8 volts) when the input voltage is 9 volts. As the load current increases, the duty cycle follows with a linear or nonlinear relation. The example converter has an equivalent internal resistance of 30 milliohms that can be computed or measured. The output voltage of converter 20 is equal to the generated voltage (provided by the action of the drivers and latches) minus the load current times the equivalent internal resistance. Therefore, as the load current increases and the duty cycle increases, it is possible for the output voltage with maximum current flow to be less than the no-load output voltage even though the duty cycle has increased.

Figure 5:
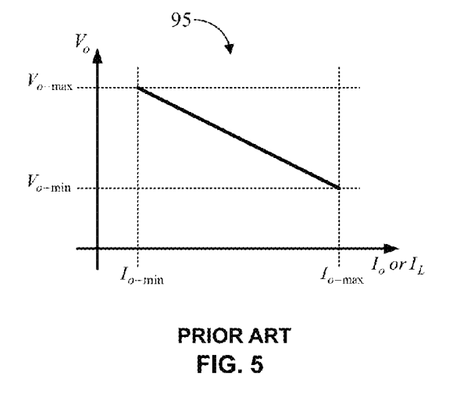
FIG. 5 is a graph depicting a relationship between the load current and output voltage for the converter of FIG. 1.
Figure 6:
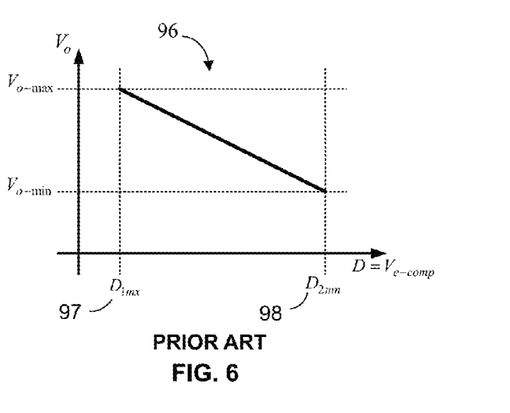
FIG. 6 is a graph depicting a relationship between the duty cycle and output voltage for the converter of FIG. 1.
Figure 8:
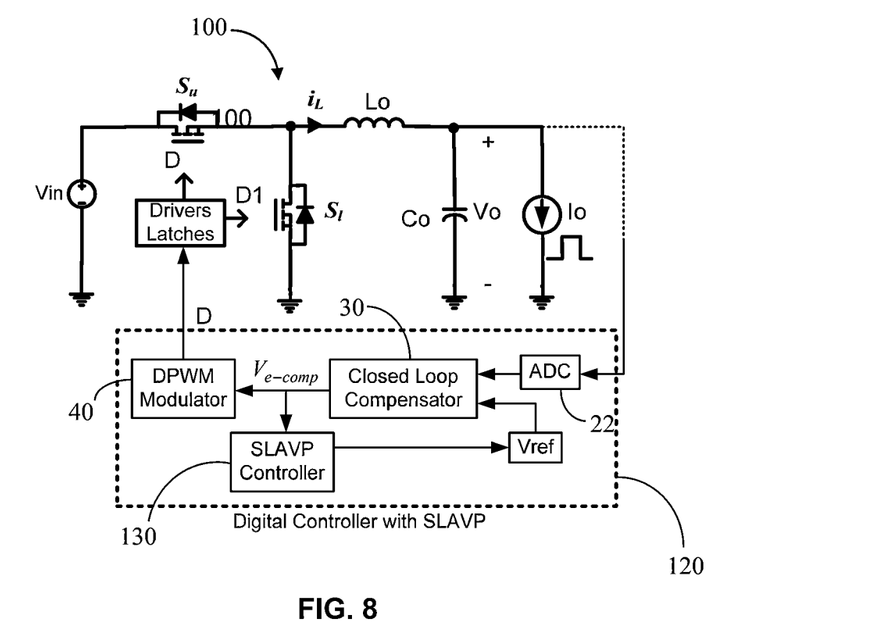
FIG. 8 is an embodiment of a power converter with a sensorless adaptive voltage positioning (SLAVP) controller of the present disclosure.

The converter 10 having the AVP controller 20 as described in FIG. 1 has an output current and output voltage relationship as depicted in FIG. 5. FIG. 5 shows an increase in current results in a drop of the output voltage. In particular, the voltage goes from $V_{o\text{-}max}$ to $V_{o\text{-}min}$ as the current goes from a minimum value to a maximum value. However, as depicted in FIG. 3 and FIG. 4, it has been demonstrated that for a DC-DC converter (used here as an example) as the output current increases, the value D, the duty cycle, increases linearly. FIG. 6 graphically depicts and summarizes the changes in D as related to the output voltage. In FIG. 6, note that the lower value of D, $D_{1mx}$ 97, and the upper value of D, $D2_{mn}$ 98, are determinable parameters and will be used in a new control apparatus and method, a sensorless adaptive voltage positioning (SLAVP) controller 120. The term sensorless, placed before AVP, defines and describes the new controller as a controller that does not require the current sensor 21 and the associated ADC 24. However, for the SLAVP controller 120, the output voltage remains as a controller input as shown in FIG. 8.

Figure 7:
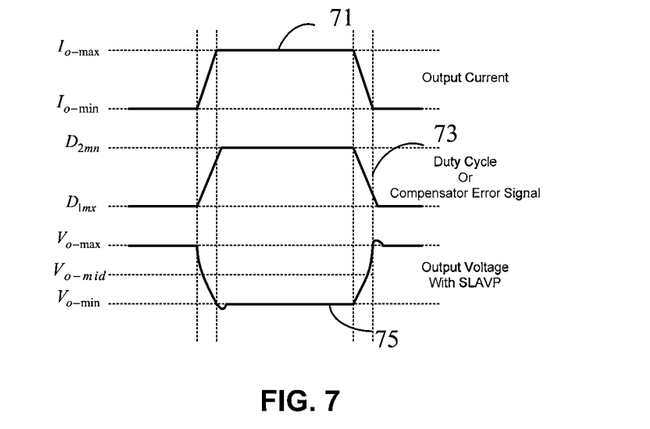
FIG. 7 is a graph depicting an exemplary behavior of a power converter controlled by a sensorless adaptive voltage positioning (SLAVP) of the present disclosure.

FIG. 7 graphically depicts exemplary variations in parameters for the converter, using the SLAVP controller 120. Graph 71 depicts a jump step in output current of the converter, caused by a change in the load. In response the SLAVP controller 120 causes the duty cycle, D, to increase from a first value to a second value as depicted in graph 73. The output voltage drops from a maximum value to a minimum value as depicted in graph 75. The output voltage remains within a desired limit (between the minimum value and the maximum value as provided in a specification) and makes voltage transitions with very little undershoot and overshoot.

The behavior of the SLAVP converter for a DC-DC buck converter is approximated and described by the relationship, equation 1. For other types of converters other relationships are possible.

$$D \approx \frac{V_o + I_o \cdot R_{eq.}}{V_{in}} = \frac{V_o}{V_{in}} + \frac{I_o \cdot R_{eq.}}{V_{in}} = D_{ideal} + D_{v-drop}(I_o)$$

The SLAVP control law is based on the equation and parameters:

$$V_{o-SLAVP-1}(D) = \frac{V_{o-min} - V_{o-max}}{D_{2mn} - D_{1mx}} \cdot (D - D_{1mx}) + V_{o-max} \quad (2)$$

$$= \frac{-\Delta V_{o-spec}}{D_{2mn} - D_{1mx}} \cdot (D - D_{1mx}) + V_{o-max}$$

$$= \mu \cdot (D - D_{1mx}) + V_{o-max}$$

Where $\mu = \frac{V_{o-min} - V_{o-max}}{D_{2mn} - D_{1mx}} = \frac{-\Delta V_{o-spec}}{D_{2mn} - D_{1mx}}$, $V_{o-min} < V_{o-nom} < V_{o-max}$ and $D_{1mx} \leq D_{2mn}$.

FIG. 8 depicts an embodiment of a new converter 100 showing the hardware that is used to implement the SLAVP law and provide a SLAVP converter 100. In particular, it should be noted that output of SLAVP controller 130, shown in FIG. 8, is a known voltage, $V_{o-max}$, plus $\mu$ (D–$D_{1mx}$). Since $\mu$ and $D_{1mx}$ are known and duty cycle, D, is available from the DPWM or compensator, a processor, digital logic, or an analog circuit provides the SLAVP controller output. Specifically, in one exemplary embodiment, the values $\mu$ and $D_{1mx}$ are calculated a priori and stored in memory of the SLAVP controller 130, and the SLAVP controller 130 uses such values along with the input D from the DPWM to calculate the appropriate output according to the equations indicated above. In another embodiment, reference voltage, $V_{ref}$, is limited by threshold values, such as described by the relationship $V_{o-min} \leq V_{ref} \leq V_{o-max}$.

When the SLAVP controller 130 generates an output voltage, referred to as $V_{ref}$, the SLAVP controller output becomes an input to the compensator 30. Using the new controller 120 of FIG. 8, the SLAVP converter 100 has AVP performance, shown in FIG. 2, without the need for current sensor 21. If the requirements of the SLAVP converter 100 is to deliver the current shown in graph 71 of FIG. 7, then the resulting output voltage of the SLAVP 100 would have the voltage-time shape as shown in graph 75 of FIG. 7.

Figure 11:
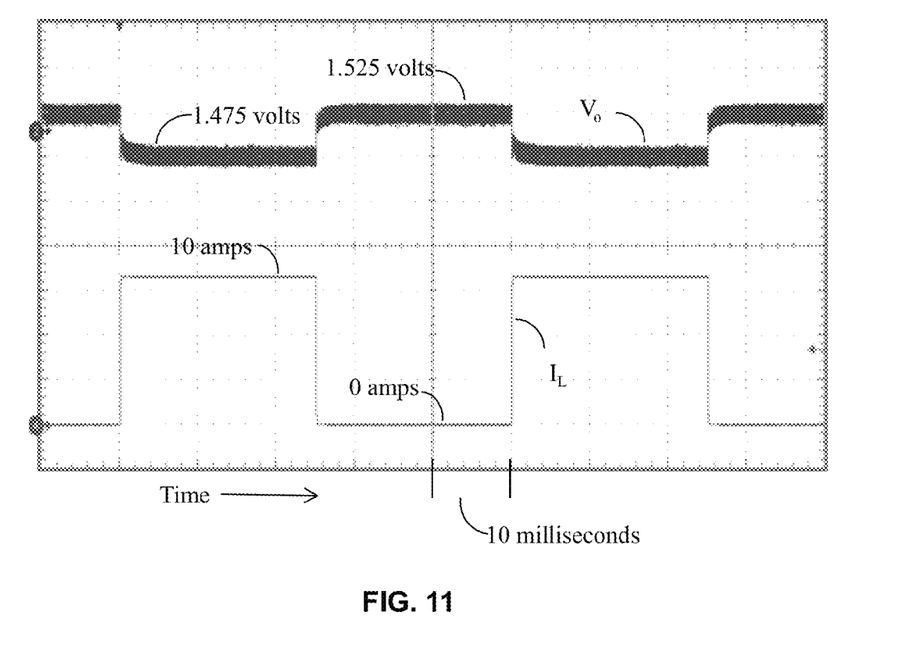
FIG. 11 depicts an exemplary performance of a power converter with a sensorless adaptive voltage positioning (SLAVP) controller of the present disclosure.

An exemplary performance of a prototype SLAVP converter 100 is depicted in FIG. 11. The changes in load current go from 0 amps to 10 amps. The controller 100 provides an output voltage that has a smooth transition from 1.525 volts to 1.475 volts. The voltage for the mid-current value of 5 amps is 1.5 volts. The above voltage values provide a $\Delta V_{o-spec}$ of 50 millivolts. The return voltage transition has similar characteristics. The output voltages shown in the performance graph have very little undershoot or overshoot. Hence, the achieved performance of the SLAVP converter 100 provides a desired output voltage for powering a variety of loads.

Figure 9:
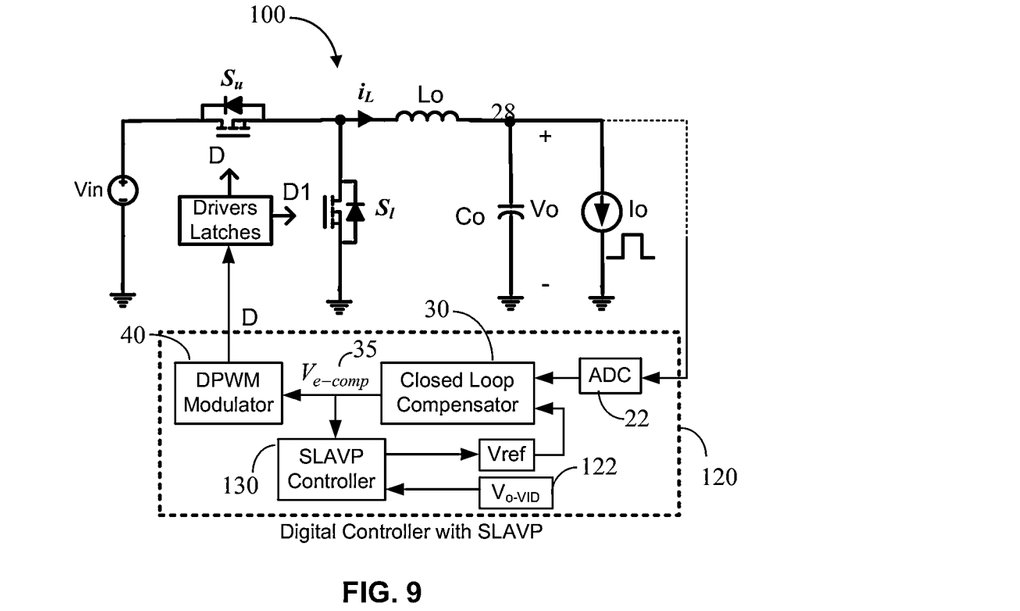
FIG. 9 is an embodiment of a power converter with a sensorless adaptive voltage positioning (SLAVP) controller where the output voltage has a range of values.

FIG. 9 depicts an embodiment of a SLAVP converter 100 with variable input voltages. Although the embodiment of the SLAVP converter shown in FIG. 8 provides good performance if the variation in input voltages is small, a new element is desired if the input voltages have large variations. The basic control law for the embodiment of FIG. 9 is described by the following equations:

$$V_{o-SLAVP-2}(D) = \lambda \cdot [V_{in} \cdot D - \xi] + V_{o-max} \quad (5)$$

Where $$\lambda = \frac{V_{o-min} - V_{o-max}}{V_{in-nom} \cdot (D_{2mn} - D_{1mx})} = \frac{-\Delta V_{o-spec}}{V_{in-nom} \cdot (D_{2mn} - D_{1mx})}$$

and $\xi = V_{in-nom} \cdot D_{1mx}$.

$V_{in-nom}$ is the nominal input voltage of the power converter at which $D_{1mx}$ and $D_{2mn}$ values are measured (in other words, $V_{in-nom}$ is the value of the input voltage at which $\lambda$ and $\xi$ are calculated) and $V_{in}$ is the actual input voltage of the power converter during the power converter operation.

Figure 10:
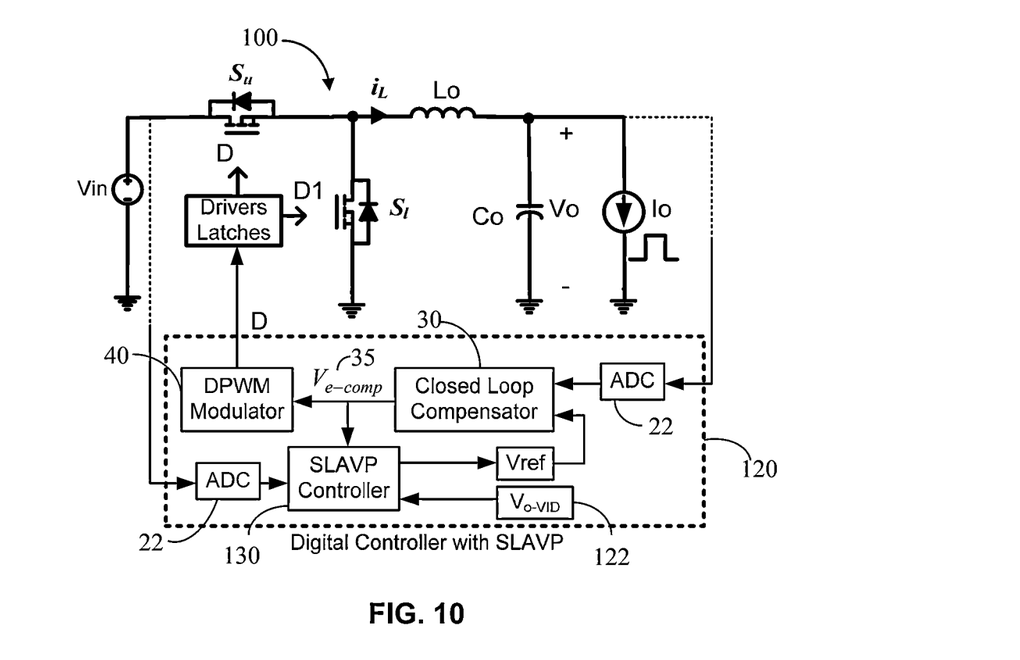
FIG. 10 is an embodiment of a power converter with a sensorless adaptive voltage positioning (SLAVP) controller where both the output voltage and the input voltage have a range of values.

FIG. 10 depicts an embodiment of a SLAVP converter 100 with variable input voltages and output voltages. The basic control law for the embodiment of FIG. 9 is described by the following equations:

$$V_{o-SLAVP-3}(D) = \beta \cdot \left(\frac{V_{in}}{V_o} \cdot D - \delta\right) + \sigma \quad (6)$$

Where $$\beta = \left(\frac{-\Delta V_{o-spec}}{\left[\frac{V_{in-nom-D_{2mn}}}{V_{o-nom-D_{2mn}}} \cdot D_{2mn} - \frac{V_{in-nom-D_{1mx}}}{V_{o-nom-D_{1mx}}} \cdot D_{1mx}\right]}\right),$$

$$\delta = \frac{V_{in-nom-D_{1mx}}}{V_{o-nom-D_{1mx}}} \cdot D_{1mx},$$

$$\sigma = V_{o-VID} + \frac{\Delta V_{o-spec}}{2}, V_{o-nom-D_{1mx}} \text{ and}$$

$V_{in-nom-D_{1mx}}$ $V_{in-nom-D_{1mx}}$ are the nominal output voltage and nominal input voltage of the power converter at which $D_{1mx}$ value is measured, $V_{o-nom-D_{2mn}}$ and $V_{in-nom-D_{2mn}}$ are the nominal output voltage and nominal input voltage of the power converter at which $D_{2mn}$ value is measured, and $V_{o-VID}$ is the desired nominal output voltage The SLAVP control law of Eq. (6) with the input voltage and output voltage consideration is relatively simple since $\beta$ and $\delta$ are constants for a given design even under variable output voltage, variable input voltage and variable load current. $\sigma$ is just the value of the output voltage ($V_o = V_{o-VID}$) plus half the value of the allowed SLAVP window ($\Delta V_{o-spec}$). Eq. (6) becomes equal to Eq. (2) when the input voltage is constant and satisfies $V_{in} = V_{in-nom}$ and when the output voltage is constant and satisfies $V_o = V_{o-nom}$.

Figure 12:
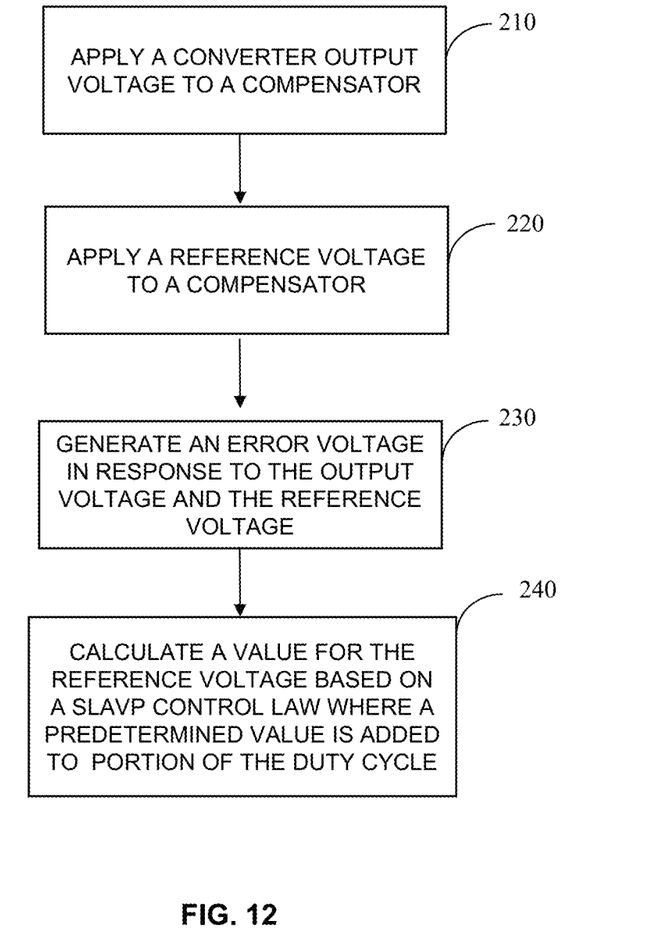
FIG. 12 is a flowchart illustrating an exemplary method of controlling the output voltage of a converter.

An exemplary embodiment for controlling the output voltage of a converter 100 is depicted by FIG. 12. The output voltage of the converter 100 is applied to a compensator 30, as shown in block 210. A reference voltage is applied as another input to the compensator, as shown by block 220. The compensator 30 generates an error voltage in response to the output voltage and the reference voltage, as shown by block 230. The error voltage is provided as an input to a digital pulse width modulation modulator 40 and causes the duty cycle of the converter switching signal to change. In addition, the error signal is an input to a SLAVP controller 130 that responds to the error signal and generates a value for the reference voltage based on the duty cycle value and a predetermined constant, as shown by block 240. The new value for the reference voltage is used by block 230 when a new error voltage is generated. The action of generating the reference voltage is based on a SLAVP control law, such as is given by Equations 2, 5 or 6.

The descriptions of embodiments of the SLAVP controller indicate that values of parameters should be predetermined and stored in memory. For example, the embodiment of SLAVP controller 130 described in FIG. 8 uses values for the parameters $\mu$, $V_{o\text{-}max}$, and $D_{1mx}$. The parameter $\mu$ is equal to $(V_{o\text{-}min} - V_{o\text{-}max})$ divided by $(D_{2mn} - D_{1mx})$. The voltages in the equation are values specified by the converter designer. For example, $V_{o\text{-}min}$ may be 1.4 volts and $V_{o\text{-}max}$ may be 1.6 volts. The values of the duty cycle parameters, $D_{2mn}$ and $D_{1mx}$ are determined by values from graph 96 of FIG. 6. For example, $D_{2mn}$ may be 0.25 and $D_{1mx}$ may be 0.18. The parameters that are determined from the prior art plots, as shown in FIG. 5 and FIG. 6, will cause the SLAVP controller 130 to have performance equivalent to the AVP controlled converter that those plots represent.

It is possible for the SLAVP controller method to be used with other power converter topologies, single-phase and multi-phase, with the appropriate derived laws for a specific topology. In addition, for other embodiments the values of $D_{2mn}$ and $D_{1mx}$ are measured and stored while the converter is active. For example, when the load current is minimum $D_{1mx}$ is measured and stored, and when the load current is maximum $D_{2mn}$ is measured and stored.

In other embodiments, the SLAVP controller is used in combination with other control functions. The main aspect of the disclosure is the use of the duty cycle or/and the compensated error to realize AVP functionality for controlling the output voltage. Variations in the disclosed control laws are possible for other converters.

While the principles of a SLAVP controller have been described by exemplary embodiments, it would be apparent to a person of ordinary skill upon reading this disclosure that SLAVP functionality may be used and added to other types of controllers, such as, for example, those that are linear and/or non-linear, that are predictive and/or adaptive, or that have a single and/or multiple control loops.

Now, therefore, the following is claimed:

1. A converter having an input voltage and providing an output voltage, the converter comprising:
    conversion elements including switching devices, an inductor and a capacitor, wherein the output voltage is available across terminals of the capacitor;
    a compensator configured to provide an error voltage in response to the output voltage and a reference voltage;
    a pulse width modulator configured to transmit a pulse width modulator signal in response to the error voltage, wherein the pulse width modulator signal has a duty cycle; and
    a controller configured to determine a duty cycle value based on the error voltage and to combine the duty cycle value with a predefined constant, thereby providing a combined value, the controller further configured to provide the reference voltage to the compensator, wherein the duty cycle value is indicative of the duty cycle, and wherein the reference voltage is based on the combined value.

2. The converter of claim 1, wherein the predefined constant is based on a minimum duty cycle value and a maximum duty cycle value.

3. The converter of claim 1, wherein the reference voltage is bound between an upper limit and a lower limit.

4. The converter of claim 3, wherein the upper limit is a value of the output voltage when a load current has a minimum allowed value and the lower limit is a value of the output voltage when the current has a maximum allowed value.

5. The converter of claim 1, wherein the reference voltage of the controller responds to changes in a nominal value for the output voltage.

6. The converter of claim 1, wherein an increase in output current results in a decrease in output voltage.

7. The converter of claim 1, wherein the proportion of the predefined constant is dependent on a maximum output voltage and a minimum output voltage.

8. A method for controlling an output voltage of a converter, comprising:
    applying the output voltage to a compensator;
    combining a predefined constant and a duty cycle value associated with a pulse width modulator;
    providing a reference voltage based on the combining;
    applying the reference voltage to the compensator;
    generating an error voltage via the compensator in response to the output voltage and the reference voltage; and
    transmitting a pulse width modulator signal from the pulse width modulator to switching elements of the converter in response to the error voltage.

9. The method of claim 8, further comprising keeping the reference voltage greater than a lower threshold value.

10. The method of claim 9, further comprising keeping the reference voltage less than an upper threshold value.

11. The method of claim 8, further comprising adjusting the duty cycle of the pulse width modulator signal in response to the error voltage.

12. The method of claim 8, further comprising changing the predefined constant if a nominal value for the output voltage is changed.

13. The method of claim 8, further comprising changing the predefined constant if a nominal value for the input voltage is changed.

14. A power converter, comprising:
    power conversion elements including a switching device, an inductor and a capacitor, the conversion elements for providing an output voltage in response to an input voltage and a pulse width modulator signal having a duty cycle;
    a pulse width modulator configured to transmit the pulse width modulator signal in response to an error voltage;
    a compensator configured to receive the output voltage and a reference voltage and to provide the error voltage; and
    a controller configured to determine, based on the error voltage, a duty cycle value indicative of the duty cycle and to combine the duty cycle value and a predefined constant, thereby providing a combined value the controller further configured to generate the reference voltage based on the combined value.

15. The power converter of claim 14, wherein the combined value is based on a lower value of the duty cycle value and an upper value of the duty cycle.

16. The power converter of claim 14, wherein the output voltage of the converter decreases as the load current increases.

17. The power converter of claim 14, wherein the controller is configured to respond to an input voltage of the converter.

18. The power converter of claim 14, wherein the response of the converter to the controller provides an adaptive voltage positioning output voltage characteristic.

19. The power converter of claim 14, wherein the controller configured to respond to variations in the input voltage and the output voltage.

20. A method for converting an input voltage to an output voltage comprising:
- providing a pulse modulator cycle to power conversion elements that receive the input voltage and provide the output voltage, wherein the pulse width modulator signal is based on an error voltage;
- sensing the output voltage;
- determining duty cycle value indicative of the duty cycle;
- combining the duty cycle value and a first predefined constant hereby providing a combined value;
- providing a reference voltage based on the combining; and
- generating the error voltage based on the reference voltage and the sensed output voltage.

21. The method of claim 20, wherein the combining comprises multiplying the duty cycle value and the first predefined constant, and wherein the method further comprises summing the combined value and a second predefined constant.

* * * * *

UNITED STATES PATENT AND TRADEMARK OFFICE
CERTIFICATE OF CORRECTION

PATENT NO. : 8,674,674 B1  
APPLICATION NO. : 13/368142  
DATED : March 18, 2014  
INVENTOR(S) : Jaber A. Abu Qahouq Page 1 of 1

It is certified that error appears in the above-identified patent and that said Letters Patent is hereby corrected as shown below:

In the Claims

Column 8, line 57, claim 14, insert a --,-- after "value".

Column 9, line 9, claim 20, after "modulator" add --signal having a duty--.

Column 9, line 16, claim 20, insert a --,-- after "constant"; replace "hereby" with --thereby--.

Signed and Sealed this  
Thirtieth Day of June, 2015

Michelle K. Lee  
*Director of the United States Patent and Trademark Office*